(12) United States Patent
Nara

(10) Patent No.: US 7,260,787 B2
(45) Date of Patent: Aug. 21, 2007

(54) INFORMATION PROCESSING APPARATUS, NETWORK SYSTEM, DEVICE-MAP DISPLAY METHOD, AND STORAGE MEDIUM

(75) Inventor: Shigeo Nara, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 889 days.

(21) Appl. No.: 09/778,831

(22) Filed: Feb. 8, 2001

(65) Prior Publication Data

US 2001/0017620 A1 Aug. 30, 2001

(30) Foreign Application Priority Data

Feb. 29, 2000 (JP) ............................. 2000/053226

(51) Int. Cl.
*G06F 13/00* (2006.01)
(52) U.S. Cl. ...................................... 715/805; 715/772
(58) Field of Classification Search ................ 345/734, 345/735, 737, 736, 853, 854, 855, 742, 738, 345/753, 802, 804, 772, 771, 778–779, 824, 345/859–862; 358/210, 1.11, 1.12, 1.15, 358/1.16, 1.17, 1.13, 1.14; 715/734–737, 715/738–739, 966, 968, 969–970, 811, 745, 715/744, 746–747, 740, 805, 803, 802, 771–773; 713/1, 2, 100
See application file for complete search history.

(56) References Cited

U.S. PATENT DOCUMENTS

| | | | | |
|---|---|---|---|---|
| 5,333,256 A | * | 7/1994 | Green et al. ................. | 715/772 |
| 5,630,079 A | * | 5/1997 | McLaughlin ................. | 345/734 |
| 5,692,143 A | * | 11/1997 | Johnson et al. ............. | 715/764 |
| 5,699,494 A | * | 12/1997 | Colbert et al. ............. | 358/1.15 |
| 5,727,135 A | * | 3/1998 | Webb et al. ................ | 358/1.14 |
| 5,832,301 A | * | 11/1998 | Yamaguchi .................. | 710/48 |
| 5,835,770 A | * | 11/1998 | Shum et al. ................. | 717/127 |
| 5,845,076 A | * | 12/1998 | Arakawa ..................... | 709/203 |
| 5,862,322 A | * | 1/1999 | Anglin et al. ................. | 714/57 |
| 5,905,905 A | * | 5/1999 | Dailey et al. ................ | 710/5 |
| 6,000,864 A | * | 12/1999 | Hanada ....................... | 400/62 |
| 6,020,974 A | * | 2/2000 | Kotsuki et al. ............ | 358/1.15 |
| 6,031,533 A | * | 2/2000 | Peddada et al. ............ | 345/733 |
| 6,054,987 A | * | 4/2000 | Richardson ................. | 345/734 |
| 6,147,687 A | * | 11/2000 | Wanderski ................... | 715/853 |
| 6,229,538 B1 | * | 5/2001 | McIntyre et al. ........... | 715/734 |
| 6,297,821 B1 | * | 10/2001 | Baker et al. ................ | 715/744 |
| 6,356,282 B2 | * | 3/2002 | Roytman et al. ........... | 345/736 |
| 6,476,903 B1 | * | 11/2002 | Slater et al. ................. | 355/40 |
| 6,493,002 B1 | * | 12/2002 | Christensen ................ | 715/779 |
| 6,662,197 B1 | * | 12/2003 | LeCrone et al. ............ | 707/204 |
| 6,670,974 B1 | * | 12/2003 | McKnight et al. .......... | 345/855 |
| 2001/0038461 A1 | * | 11/2001 | Murakami et al. ......... | 358/1.13 |
| 2003/0212992 A1 | * | 11/2003 | Ronning et al. ............ | 717/178 |

* cited by examiner

Primary Examiner—Steven Sax
(74) Attorney, Agent, or Firm—Fitzpatrick, Cella, Harper & Scinto

(57) ABSTRACT

An information processing apparatus provides the user with a status of a device on a network correctly and efficiently to improve the work efficiency of the user. A display unit displays a device map according to information previously stored in a storage unit, when an application for displaying the device map (status of the device on the network) is activated, and re-displays the device map thereafter according to the latest information obtained by an obtaining unit.

39 Claims, 12 Drawing Sheets

| | | |
|---|---|---|
| 61 | NUMBER OF REGISTERED DEVICES | 61a |
| | COMMENT | 61b |
| 62 — 1 | TYPE OF DEVICE | 62a |
| | ATTRIBUTE INFORMATION | 62b |
| | DEVICE NAME | 62c |
| | NAME OF CONNECTED PC | 62d |
| | COMMENT | 62e |
| 2 | TYPE OF DEVICE | |
| | ATTRIBUTE INFORMATION | |
| | DEVICE NAME | |
| | NAME OF CONNECTED PC | |
| | COMMENT | |
| 3 | TYPE OF DEVICE | |
| | ATTRIBUTE INFORMATION | |
| | DEVICE NAME | |
| | NAME OF CONNECTED PC | |
| | COMMENT | |
| ⋮ | ⋮ | |
| N | TYPE OF DEVICE | |
| | ATTRIBUTE INFORMATION | |
| | DEVICE NAME | |
| | NAME OF CONNECTED PC | |
| | COMMENT | |

FIG. 6

INFORMATION PROCESSING APPARATUS, NETWORK SYSTEM, DEVICE-MAP DISPLAY METHOD, AND STORAGE MEDIUM

BACKGROUND OF THE INVENTION

1. Field of the Invention

The present invention relates to information processing apparatuses used in a network system in which a plurality of user terminal apparatuses connected to the network can share peripheral devices, such as printers and scanners, connected to the network; such network systems; device-map display methods; and storage media which store processing steps in a computer-readable form for implementing the above.

2. Description of the Related Art

Since personal computers (hereinafter called PCs) and peripheral devices, such as printers, scanners (image reading devices), and digital cameras, have become more prevalent, a user frequently uses a personal computer to read image information of a document through a scanner to generate electronic data, or edits the document and prints it through a printer.

Networks such as local area networks (LANs) have also become widely popular, and a demand for sharing peripheral devices, such as printers, modems, and scanners, on networks has been increasing. When various peripheral devices are shared in a network, overall cost is suppressed and a space for installing such devices is maintained as small as possible.

In a conventional network system, however, the status (condition of use) of each peripheral device connected to the network is checked and indicated for the sake of the user. When a large number of peripheral devices are connected to the network, it takes more time to check the status of each of the peripheral devices. In addition, application software for indicating the result (status information of the peripheral devices) of the checking may be delayed in being activated.

SUMMARY OF THE INVENTION

The present invention has been made in consideration of the above condition. Accordingly, it is an object of the present invention to provide an information processing apparatus, a network system, and a device-map display method which correctly and efficiently provide the user with the status information of a device connected to a network to allow the user to improve work efficiency, and a storage medium which stores processing steps in a computer-readable form which implement the above.

The foregoing object is achieved in one aspect of the present invention through the provision of an information processing apparatus capable of activating an application for displaying a status of a device on a network on a display screen, including storage means for storing information of the device on the network in a resident memory; first display control means for displaying information of the device on the network on the display screen according to the information stored in the storage means, when the application is activated; obtaining means for obtaining information of the device on the network through the network when the application is activated; and second display control means for updating the content displayed by the first display control means, according to the information obtained by the obtaining means.

The foregoing object is achieved in another aspect of the present invention through the provision of an information processing method for displaying a status of a device on a network on a display screen, including a reading step of reading information of the device on the network from a resident memory; a first display control step of displaying information of the device on the network on the display screen according to the information stored in the resident memory, when the application is activated; an obtaining step of obtaining information of the device on the network through the network when the application is activated; and a second display control step of updating the content displayed in the first display control step, according to the information obtained in the obtaining step.

The foregoing object is achieved in still another aspect of the present invention through the provision of a computer program for displaying a status of a device on a network on a display screen, including a reading step of reading information of the device on the network from a resident memory; a first display control step of displaying information of the device on the network on the display screen according to the information stored in the resident memory, when the application is activated; an obtaining step of obtaining information of the device on the network through the network when the application is activated; and a second display control step of updating the content displayed in the first display control step, according to the information obtained in the obtaining step.

Further objects, features and advantages of the present invention will become apparent from the following description of the preferred embodiments(with reference to the attached drawings).

BRIEF DESCRIPTION OF THE DRAWINGS

FIG. 6 is a view of a format in which device information used for displaying the device map is stored.

DESCRIPTION OF THE PREFERRED EMBODIMENTS

Figure 1:
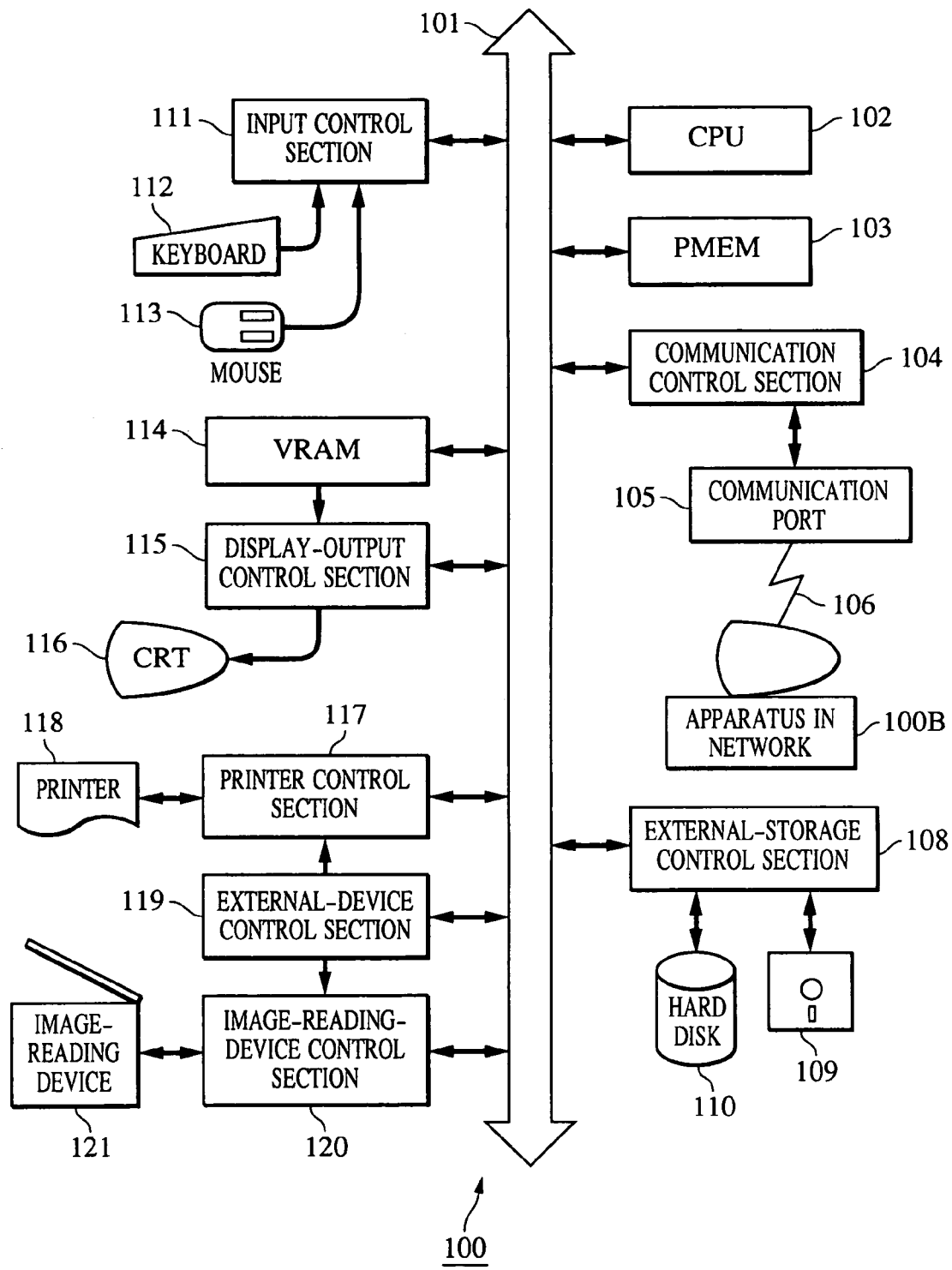
FIG. 1 is a block diagram showing the structure of an information processing apparatus according to a first embodiment of the present invention.

Embodiments of the present invention will be described below by referring to the drawings.

First Embodiment

The present invention is applied, for example, to an information processing apparatus 100 shown in FIG. 1. The information processing apparatus 100 displays a device map according to status information of a device, stored in advance, when a software application (device-map display application) for displaying the status of the device on a network, as the device map, is activated, activates processing for searching for the latest status information of the device, and re-displays the device map according to the state information of the device obtained by the searching processing.

[Structure of Information Processing Apparatus 100]

The information processing apparatus 100 performs a document-information processing function as well as other functions. The information processing apparatus 100 includes an input control section 111 to which a keyboard 112 and a mouse 113 serving as operation sections are connected, a video image memory (VRAM) 114, a display-output control section 115 for accessing the VRAM 114, a printer control section 117 to which a printer 118 is connected; an image-reading-device control section 120 to which an image reading device 121 such as a scanner is connected. Additionally, the apparatus includes an external-device control section 119 for controlling the printer control section 117 and the image-reading-device control section 120, a central processing unit (CPU) 102 for controlling the operation of the entire apparatus 100, a program memory (PMEM) 103, a communication control section 104 to which a communication port 105 is connected, and an external-storage control section 108 to which a hard disk (HD) 110 and a floppy disk (FD) 109 are connected, all of which are connected through a system bus 101 to enable data transmission and receiving, as shown in FIG. 1.

In such an information processing apparatus 100, a processing program and various types of data which the CPU 102 uses to control the operation are selected and read from the hard disk 110 through the external-storage control section 108, and are written into the PMEM 103. The CPU 102 executes the program stored in the PMEM 103 to control the operation of the apparatus 100, described in detail later. The PMEM 103 is also used as a text memory. Data input from the keyboard 112, for example, is stored in the PMEM 103 as code information.

The program stored in the PMEM 103 may be stored in a storage medium, such as the FD 109, directly connected to the apparatus 100. Alternatively, the program may be stored in another apparatus 100B connected to a network. In this case, the program is read through the network into the apparatus 100. The another apparatus 100B is an apparatus having the same structure as the apparatus 100, or a printer or an image-reading device shared in the network.

The communication control section 104 controls input and output data passing through the communication port 105. Under the control of the communication control section 104, communications with the another apparatus 100B connected to the network are implemented through a communication line 106. In the present embodiment, the communication port 105 and the communication line 106, both of which are connected to the communication control section 104, correspond to a network such as a LAN. The network is not limited to a LAN and may be a usual public line.

The external-storage control section 108 controls the HD 110 and the FD 109 used as data file storage.

The input control section 111 controls the connected operation sections (input apparatuses) such as the keyboard 112 and the mouse 113. The user operates the keyboard 112 and the mouse 113 to issue an operation instruction to the apparatus 100. In the present embodiment, the mouse 113 is used as a pointing device (PD) for specifying image information on a CRT 116. By using the mouse 113, the user moves a cursor displayed on the screen of the CRT 116 in the X and Y directions as desired to select a desired command or iron indicated in a command menu on the screen to specify various types of processing, to determine an object to be edited, and to specify a drawing position.

Data to be displayed on the screen of the CRT 116 is developed in the VRAM 114 as bit-map data. The display-output control section 115 access the VRAM 114 to display the data developed in the VRAM 114 on the CRT 116.

The printer control section 117 controls data output to the connected printer 118.

The image-reading-device control section 120 controls the connected image-reading device 121.

When the apparatus 100 functions as a server on a network, the image-reading-device control section 120 and the image-reading device 121 are required. When the apparatus functions as a client on a network, neither the image-reading-device control section 120 nor the image-reading device 121 is required since an image-reading-device control section and an image-reading device connected to the another apparatus 100B (server) can be used instead through the communication control section 104 and the communication port 105. It is assumed in the present embodiment that even when the image reading device 121 and the apparatus 100 are physically separate components, or even when they are integrated as a single component, the same function is implemented.

[Operation of Information Processing Apparatus 100]

Figure 2:
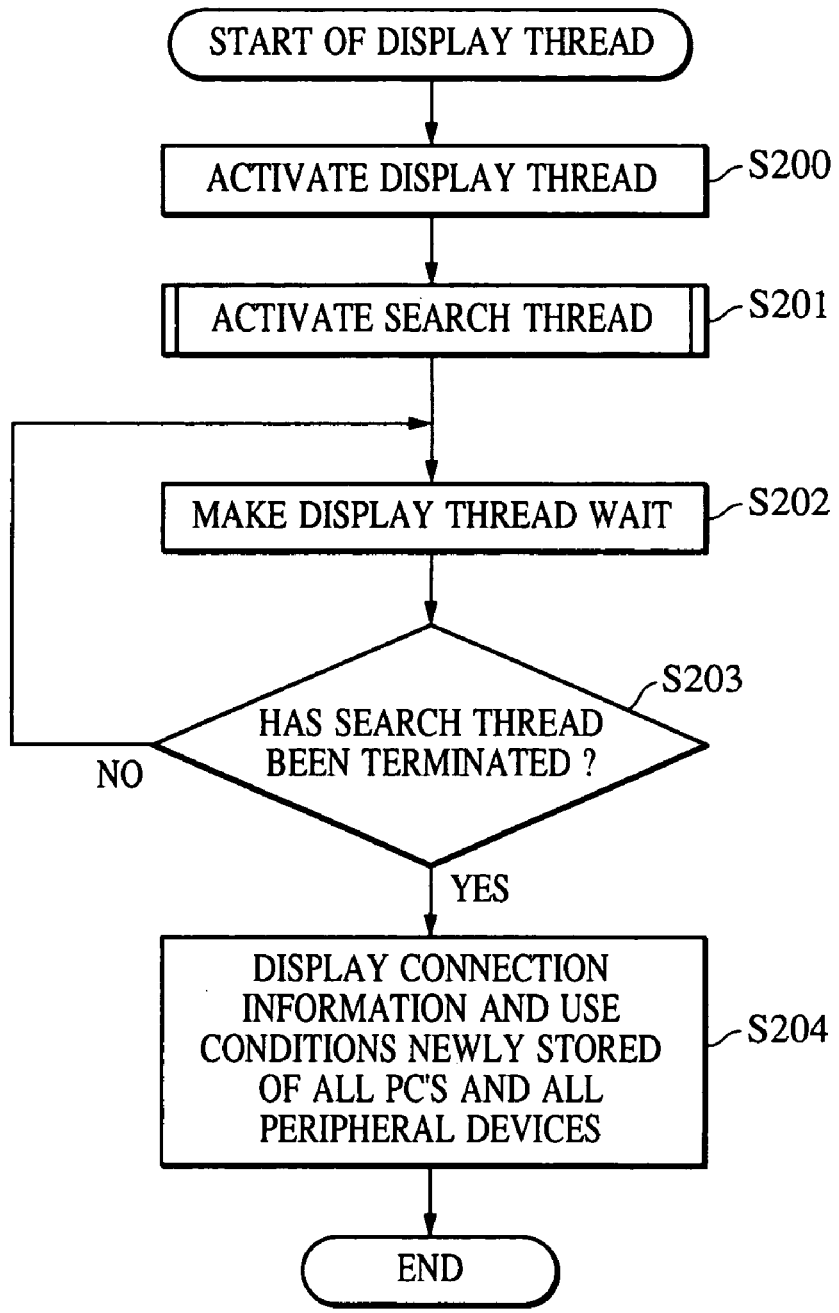
FIG. 2 is a flowchart of an operation ("display thread") of the information processing apparatus.
Figure 3:
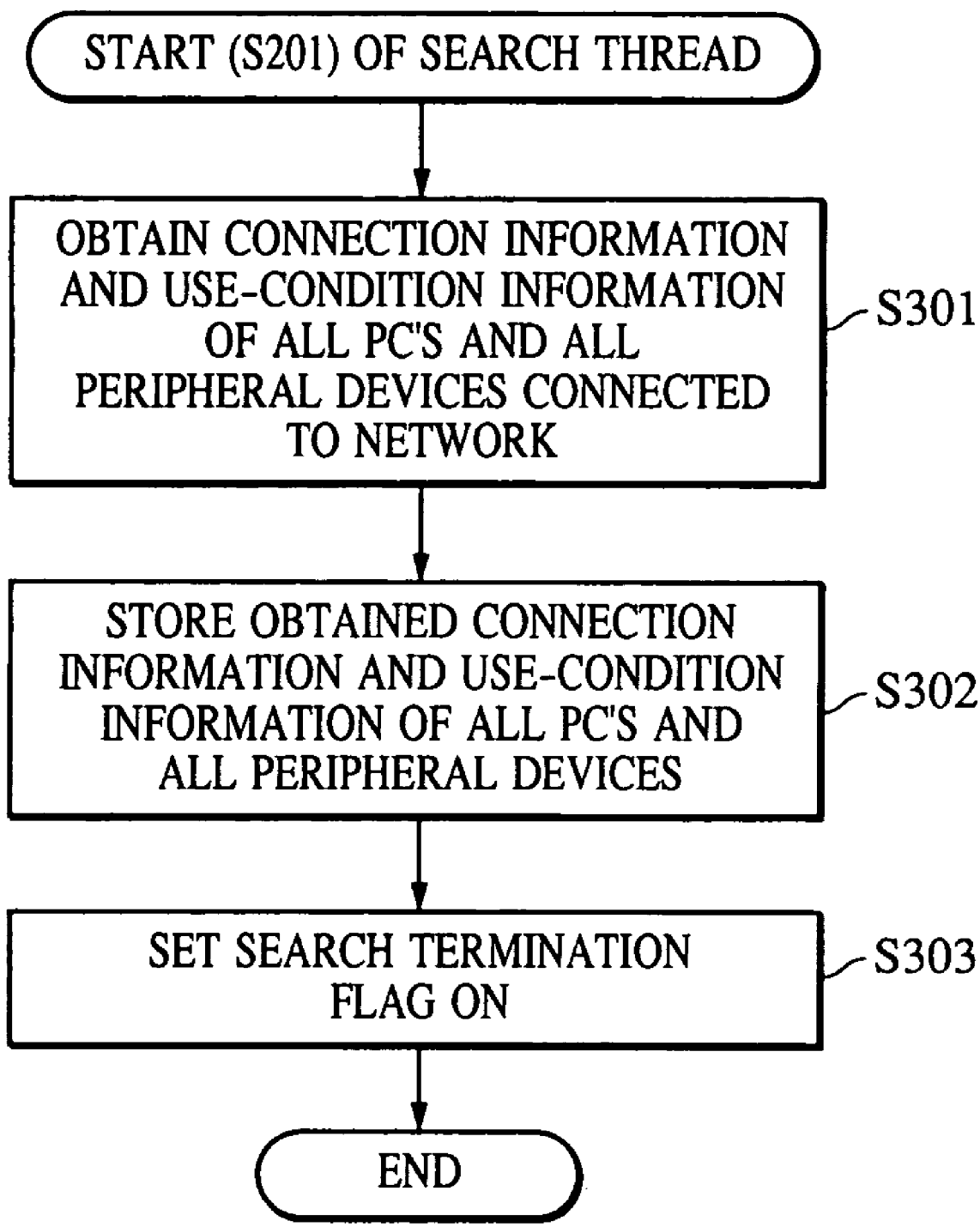
FIG. 3 is a flowchart of a "search thread" activated by the "display thread."
Figure 4:
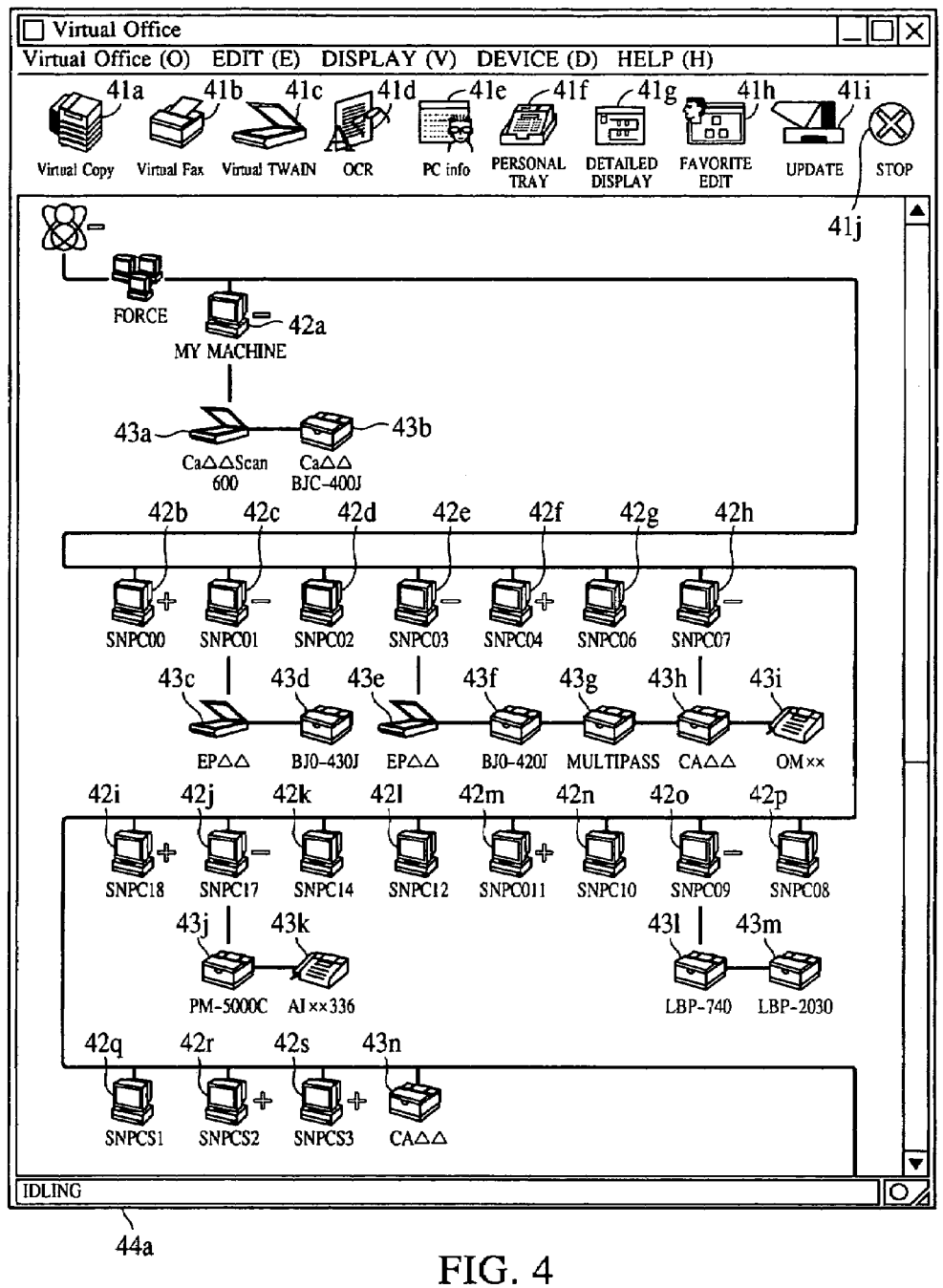
FIG. 4 is a view showing an example device map (in idling) shown on a screen in the information processing apparatus.
Figure 5:
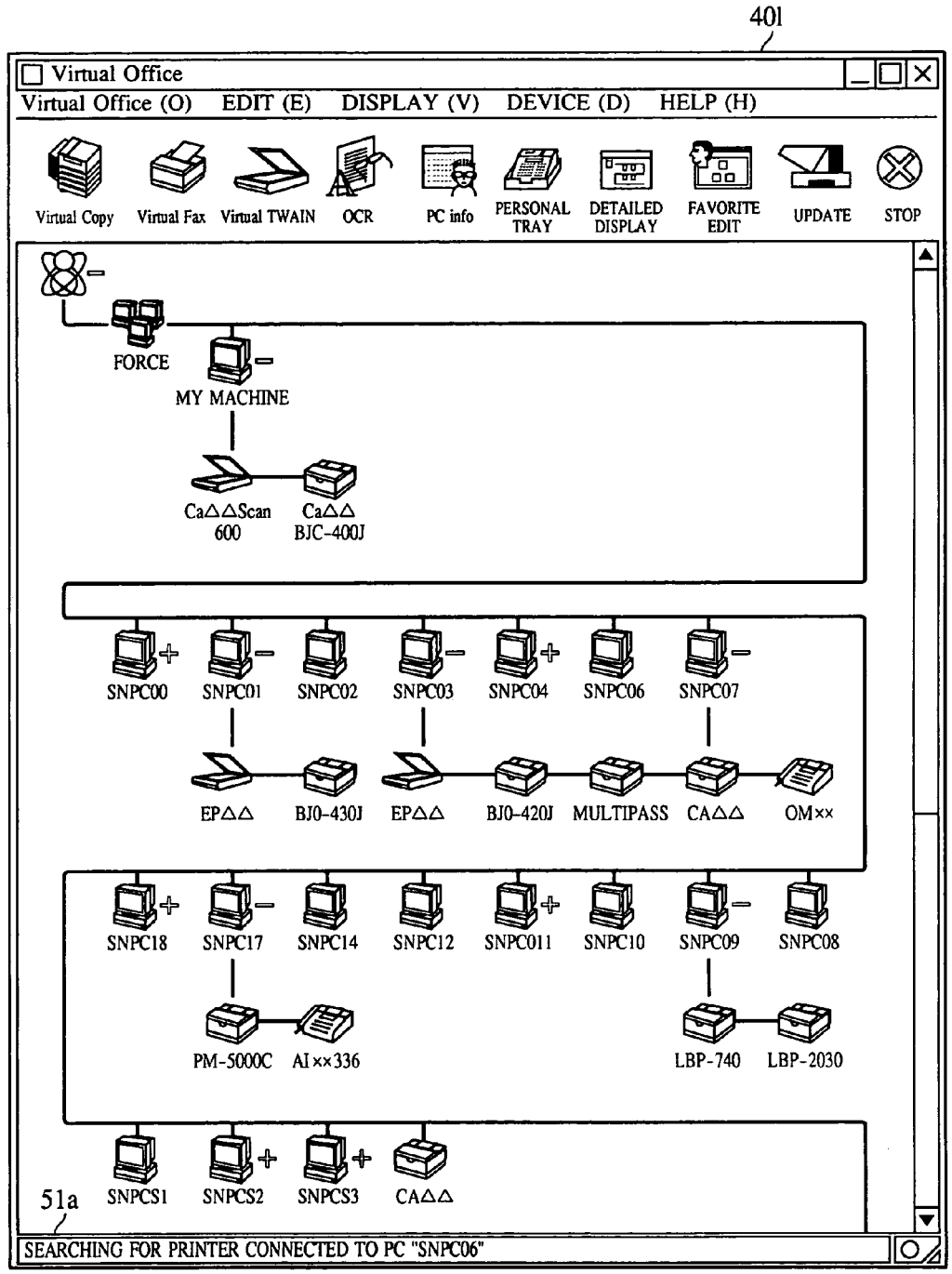
FIG. 5 is a view showing an example device map (in searching) shown on the screen in the information processing apparatus.

FIG. 2 and FIG. 3 are flowcharts showing a "display thread" and a "searching thread" activated by the information processing apparatus 100. FIG. 4 and FIG. 5 are views showing example device maps displayed on the CRT 116 of the information processing apparatus 100. FIG. 6 is a view showing information stored in the information processing apparatus 100. The operations of the information processing apparatus 100 will be described below by referring to FIG. 2 to FIG. 6.

The "display thread" (device-map display application) is first activated in step 200. According to processing (processing in step S302 shown in FIG. 3) for "storing the connection information and the use conditions of all PCs and all peripheral devices in a network," described later, the connection information and the use-condition information of all the PCs and all the peripheral devices (hereinafter, peripheral devices or devices include PCs) in the network are displayed on the CRT 116 according to information stored previously. By this operation, the connection information and the use-condition information of the devices in the network are displayed in a window screen of the CRT 116 as a device map when the display thread is activated in step S200.

When the display thread is activated, a window is displayed on the screen of the CRT 116 such as the window shown in FIG. 4.

In FIG. 4, a main window 401 shows a menu, a tool bar, and the icons indicating devices on the network. Icons 41a to 41*j* represent predetermined functions. The shapes of the icons are changed according to the types (PC, printer, image-reading apparatus, facsimile machine, modem or others) of devices. Icons 42*a* to 42*s* and 43*a* to 43*n* indicate devices registered in advance. For example, icons 42*b*, 42*c*, 42*d*, 42*e*, and 42*f* indicate PCs, an icon 43*c* indicates an image-reading device connected to the PC (42*c*), and an icon 43*d* indicates a printer connected to the PC (42*c*). An icon 43*e* indicates an image-reading device connected to the PC (42*e*), and an icon 43*f* indicates a printer connected to the PC (42*e*).

Among the icons 42*a* to 42*s* and 43*a* to 43*n*, since the target apparatus (information processing apparatus 100 in this case) is a special device, its icon (my machine shown near 42*a* in FIG. 4) is illustrated separately from those of the other devices.

The user of the target device (information processing apparatus 100) can send various operation instructions to the icons 42*a* to 42*s* and 43*a* to 43*n* by operating the mouse 113 or the keyboard 112. When a drag and drop operation is achieved by the mouse from the icon 43*e* which indicates the image-reading device to the icon 43*d* which indicates the printer connected to the image-reading device, for example, a copying operation is achieved in a way in which the image-reading device (43*e*) reads an image and the printer (43*d*) prints the image.

As described above, in the information processing apparatus 100, the device map shown in FIG. 4 is displayed on the CRT 116 according to the connection information and the use-condition information stored previously of all the devices connected to the network when the "display thread" is activated.

Returning to FIG. 2, the "search thread" shown in FIG. 3 is activated in step S201, whereby, the information processing apparatus 100 achieves the following processing as shown in FIG. 3. The current connection information and the current use conditions of all devices connected to the network are obtained through the network in step S301. The information of PCs and the information of devices connected to the PCs are directly obtained from the PCs. When a management server is connected to the network and periodically collects the information of the PCs and the devices connected to the PCs, the information may be obtained from the management server. The processing for obtaining the connection information and the use-condition information of the devices includes a process for displaying the device currently being searched for in a status line 51*a* of the main window 401, as shown in FIG. 5. By this process, the user can recognize the device being searched for. When the search process is terminate, "idling" is displayed in the status line of the main window 401, as shown by 44*a* in FIG. 4. By this indication, the user can recognize that searching has been terminated and the latest statuses are shown. The connection information and the use conditions of all the devices on the network, obtained by the searching process achieved in step S301, is stored in the HD 110 in step S302.

FIG. 6 shows an example format of a device information table which stores information related to the devices in the HD 110.

In FIG. 6, a header section 61 includes an area 61*a* for storing the total number (number of registered devices) of devices registered in advance and an area 61*b* for storing a comment. The number (N in this case) of data sections 62 corresponds to that of registered devices stored in the area 61*a*. Each data section 62 includes areas 61*a* to 62*e*. An area 62*a* stores information indicating the type of a device, such as PC, image-reading device, printer, and others. An area 62*b* stores attribute information. When the type of device stored in the area 62*a* is PC, the attribute information stored in the area 62*b* is TWAIN server, FAX server, or others. When the type of device stored in the area 62*a* is image-reading device, the attribute information stored in the area 62*b* is color, with ADF, or others. When the type of device stored in the area 62*a* is printer, the attribute information stored in the area 62*b* is color, local connection, network connection, or others. An area 62*c* stores the name of the device. When a data section is for the PC corresponding to the icon 42*b* shown in FIG. 4, for example, SNPC00 is stored in the area 62*c* as the name of the device. An area 62*d* stores the name of a PC connected to the device. When the type of device stored in the area 62*a* is image-reading device or printer, for example, the name of a PC to which the device is connected is stored. More specifically, when a data section 62 is for the image-reading device corresponding to the icon 43*c* shown in FIG. 4, the name, SNPC01, of the PC connected to the image-reading device is stored in the area 62*d* as the name of a PC connected. When the type of device stored in the area 62*a* is PC, the area 62*d* stores NULL. An area 62*e* stores a comment.

After the connection information and the use conditions of all the devices on the network are stored in the HD 110 in step S302, a "search termination flag" disposed in an area shared by the "display thread" and the "search thread" is set ON in step S303 and the present thread is terminated.

After the above-described "search thread" is activated, 11 the "display thread" continues the processing from step S202. After the "search thread" is activated in step S201 (steps S301 to S303), the "display thread" enters a sleep state for one or two seconds in step S202. It is determined in step S203 whether the "search thread" has been terminated or not. Whether the "search thread" has been terminated is determined by the state, ON or OFF, of the search termination flag disposed in the area shared by the "display thread" and the "search thread." When it is determined that the "search thread" has not yet been terminated, the processing returns to step S202, the "display thread" enters the sleep state again, and the termination of the "search thread" is awaited. When it is determined in step S203 that the "search thread" has been terminated, the device map shown in FIG. 4 is re-displayed in the CRT 116 in step S204 according to the information stored in the HD 110, shown in FIG. 6, namely, the connection information and the use-condition information newly stored of all the devices on the network.

As described above, in the present embodiment, the device map is displayed according to the connection information and the use-condition information obtained previously of the devices on the network when the device-map display application is activated, and the latest connection information and the latest use-condition information of the devices on the network are obtained by parallel processing, and the device map is re-displayed according to the latest information immediately after the latest information is obtained. Therefore, even if a number of devices are connected to the network, a condition does not occur in which the display of a device map is delayed due to a long time to check the statuses of the devices. The user can efficiently achieve a desired work.

In the first embodiment, when the status of a device is changed after the "display thread" is activated, the icon thereof may be displayed in a different way (such as in a blinking form) from the icons of devices of which the statuses are not changed, when the device map is re-displayed. Then, the user can easily and positively identify the device of which the status has been changed after the device-map display application was activated, and the user is prevented from erroneously recognizing the device information.

Second Embodiment

Figure 7:
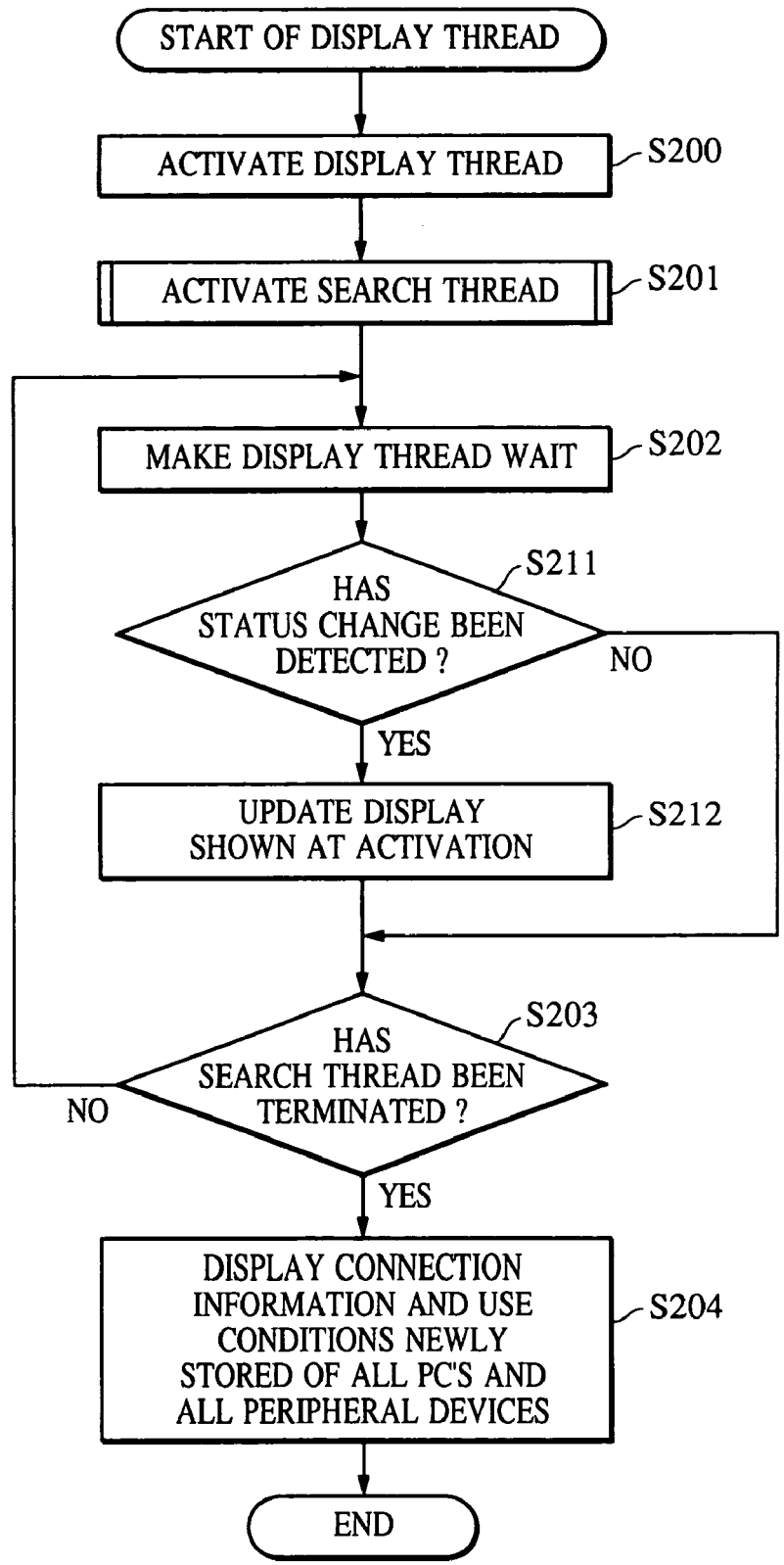
FIG. 7 is a flowchart of an operation ("display thread) of the information processing apparatus, according to a second embodiment.
Figure 8:
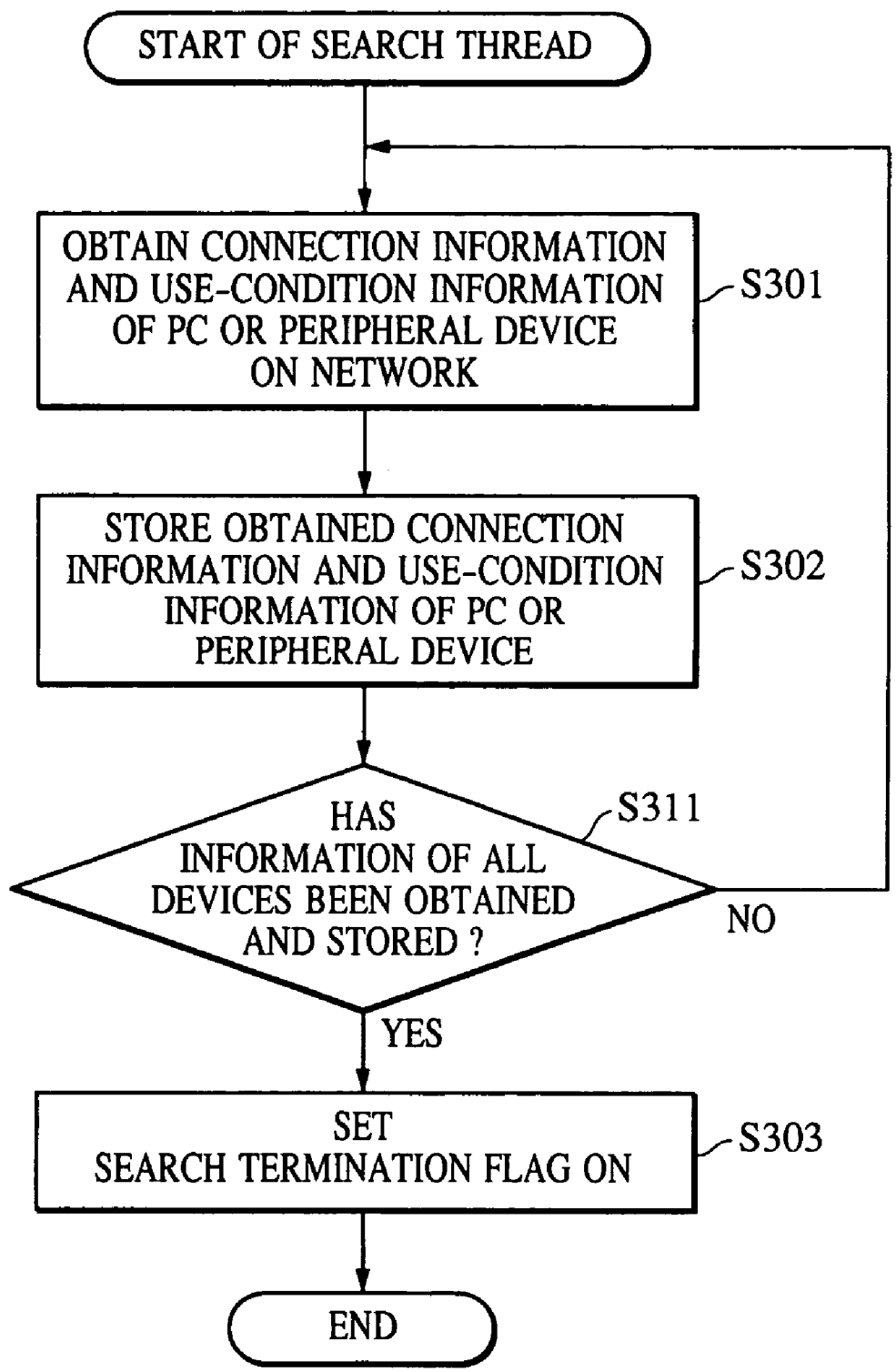
FIG. 8 is a flowchart of a "search thread" activated by the "display thread" according to the second embodiment.

In the present embodiment, operations shown in FIG. 7 and FIG. 8 are achieved in the information processing apparatus 100 shown in FIG. 1, instead of the operations shown in FIG. 2 and FIG. 3. The same symbols as those used in the flowcharts shown in FIG. 2 and FIG. 3 are assigned to the same steps in flowcharts shown in FIG. 7 and FIG. 8 as those shown in FIG. 2 and FIG. 3, and detailed descriptions thereof will be omitted.

In the present embodiment, a "search thread" for re-displaying a device map is activated, and when a device whose status is changed after a "display thread" is activated is detected, the icon of the device is then updated. The operation of the information processing apparatus 100 in the present embodiment will be described below by referring to FIG. 7 and FIG. 8.

In the same way as in the first embodiment, a "display thread" (device-map display application) shown in FIG. 7 is first activated in step 200. According to processing for "storing the connection information and the use conditions of all PCs and all peripheral devices in a network," the device map shown in FIG. 4 is displayed on the CRT 116 according to information stored previously. The previously stored information (the connection information and the use-condition information of all the devices on the network) is stored in the format shown in FIG. 6 in a data table.

A "search thread" shown in FIG. 8 is activated in step S201. In the present embodiment, as shown in FIG. 8, the connection information and the use condition of each device on the network are obtained (step S301), the obtained information is stored in the HD 110 (step S302), and after the connection information and the use conditions of all the devices on the network are obtained and stored (step S311), a search termination flag is set ON. The information (the connection information and the use-condition information of all the devices on the network) obtained in step S302 is stored in the format shown in FIG. 6 in a temporary table. After the "search thread" shown in FIG. 8 is activated in step S201, the "display thread" enters a sleep state for one or two seconds in step S202.

In step S211, the data table which has stored the information when the "display thread" is activated in step S200 is compared with the temporary table which has stored one by one the information obtained by the "search thread" and it is determined whether the information (status) has been changed. When it is determined in step S211 that the status has been changed, the icon of the device of which the status has been changed is updated in step S212 in a way corresponding to the change.

In step S203, it is determined whether the "search thread" has been terminated or not. When it is determined that the "search thread" has not yet been terminated, the processing returns to step S202, the "display thread" enters the sleep state again, and the termination of the "search thread" is awaited. When it is determined in step S203 that the "search thread" has been terminated, the device map is re-displayed in the CRT 116 in step S204b according to the connection information and the use-condition information newly stored of all the devices on the network.

According to the present embodiment, the device map reflects the latest statuses of devices in real time, and the user can recognize the latest statuses of the devices in real time.

Third Embodiment

Figure 9:
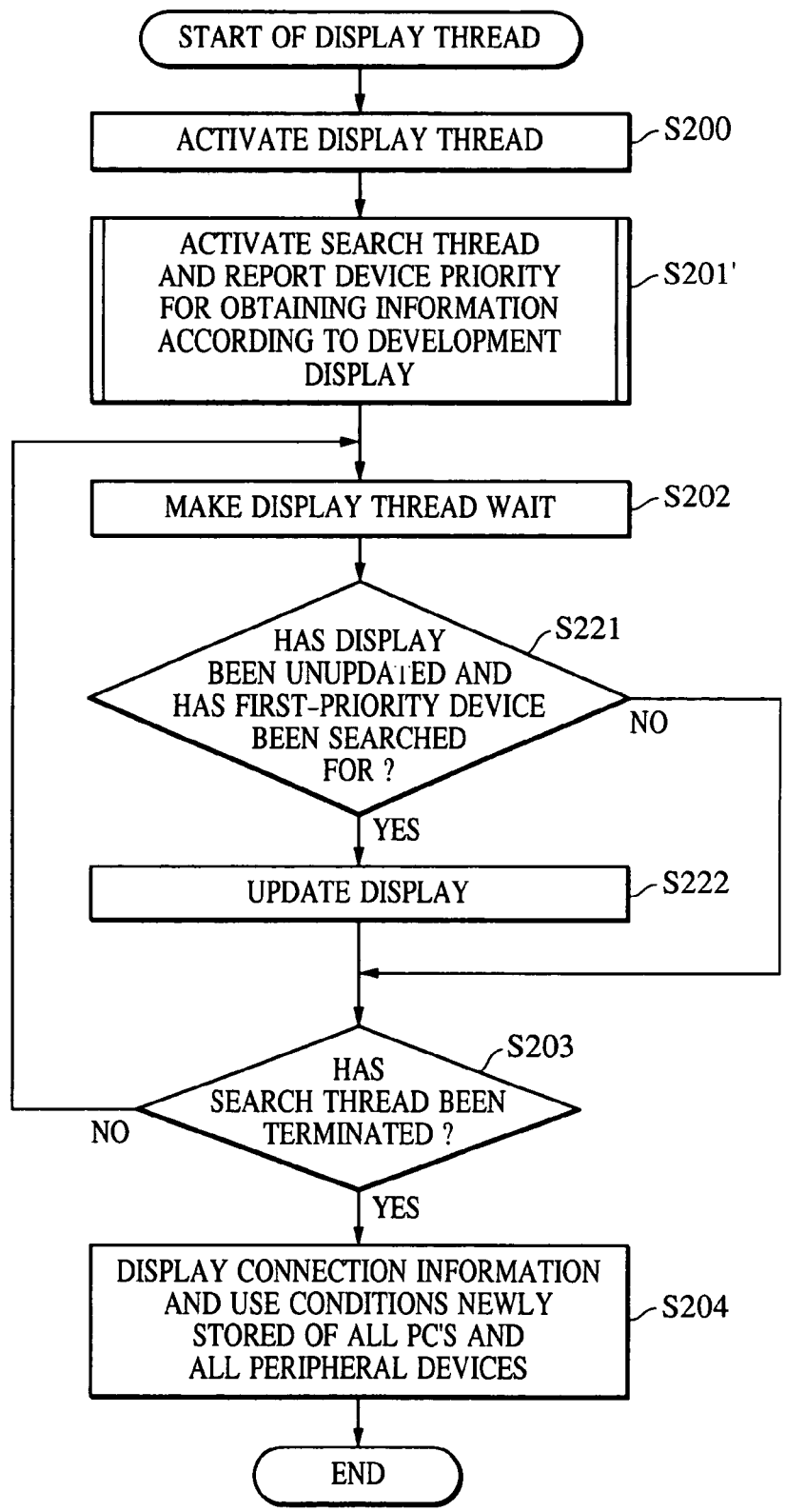
FIG. 9 is a flowchart of an operation ("display thread) of the information processing apparatus, according to a third embodiment.
Figure 10:
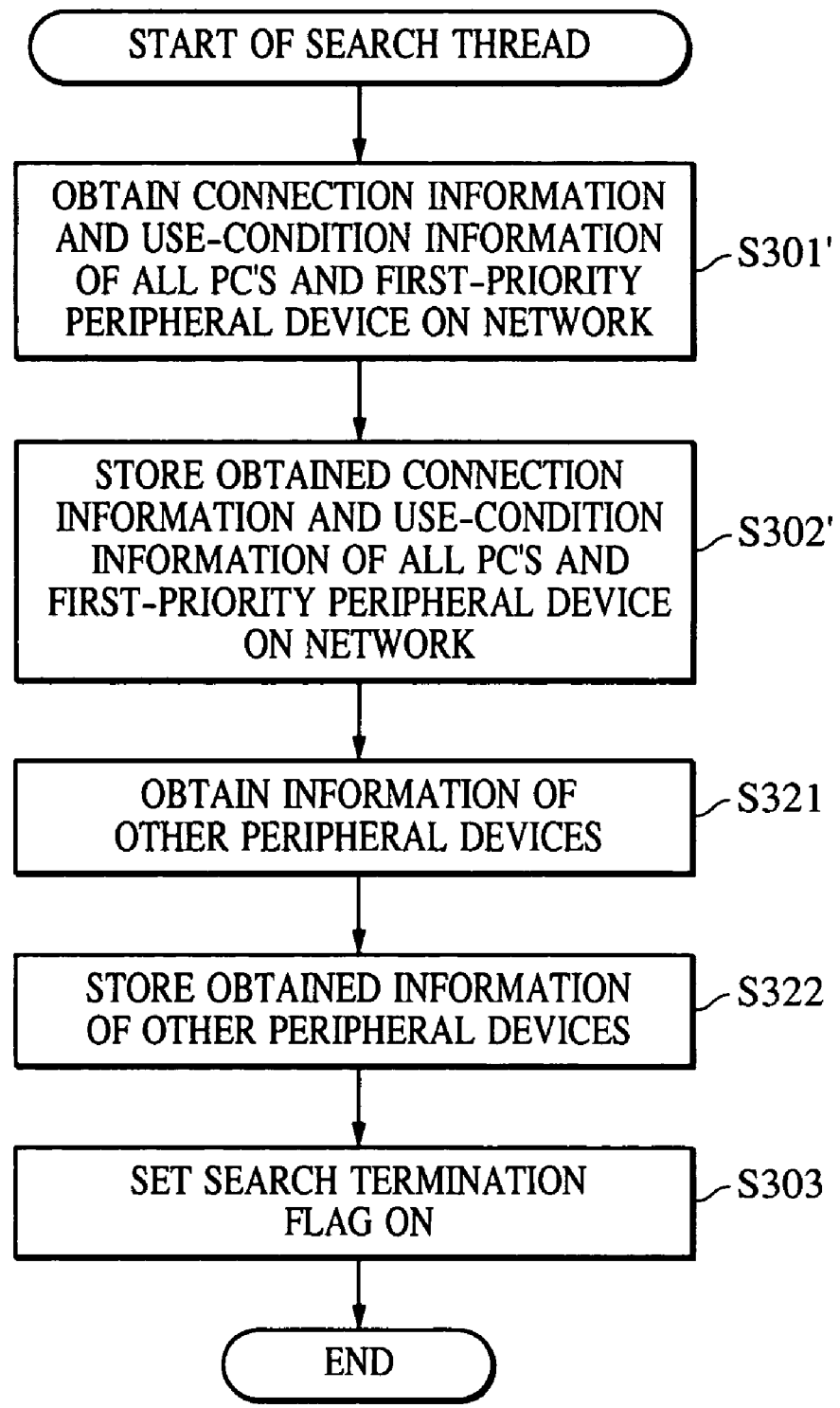
FIG. 10 is a flowchart of a "search thread" activated by the "display thread" in the third embodiment.

In the present embodiment, operations shown in FIG. 9 and FIG. 10 are achieved in the information processing apparatus 100 shown in FIG. 1, instead of the operations shown in FIG. 2 and FIG. 3. The same symbols as those used in the flowcharts shown in FIG. 2 and FIG. 3 are assigned to the same steps in flowcharts shown in FIG. 9 and FIG. 10 as those shown in FIG. 2 and FIG. 3, and detailed descriptions thereof will be omitted.

In the present embodiment, priority is specified for obtaining information in a "search thread" according to a predetermined condition. Priority is given, for example, to devices which are shown in a development-display manner, described later, in a device map. More specifically, the information of devices which are shown in the development-display manner in the device map is first obtained, the corresponding display is updated, and then, the information of devices which are not shown in the development-display manner is searched for.

In the window screen shown in FIG. 4, a minus sign (−) is attached to the icon 42c, and the icons 43c and 43d of the devices locally connected to the PC corresponding to the icon 42c are displayed in the development-display manner. The devices of the icons 43c and 43d are called "development-displayed" devices. On the other hand, a plus sign (+) is attached to the icon 42b, and a device locally connected to the PC corresponding to the icon 42b is not shown in the development-display manner.

In the present embodiment, the user can operate the mouse 113 to determine for each device whether development display is achieved or not. This setting information is stored in the HD 110. When a "display thread" is activated, whether development display is applied to the device map is determined according to this setting information. During the period from when the "display thread" is activated to when re-display is completed, an operation for changing the setting of development display may be disabled.

The operation of the information processing apparatus 100 in the present embodiment will be described below by referring to FIG. 9 and FIG. 10.

In the same way as in the first embodiment, a "display thread" (device-map display application) shown in FIG. 7 is first activated in step 200. According to processing for "storing the connection information and the use conditions of all PCs and all peripheral devices in a network," the device map shown in FIG. 4 is displayed on the CRT 116 according to information stored previously. According to the information of whether development display is applied, stored in the HD 110, the device map is shown on the CRT 116.

A "search thread" shown in FIG. 8 is activated in step S201'. The information of whether development display is applied is also sent to the "search thread." By this information, the following processes are achieved.

According to the information (information of whether development display is applied) sent from the "display thread," the connection information and the use conditions of devices (hereinafter called first-priority devices) which are shown in the development-display manner among all devices on the current network are obtained in step S301'.

In step S302', the connection information and the use conditions of the first-priority devices, obtained in the search process achieved in step S301' are stored in the HD 110. Then, a "priority-search termination flag" disposed in an area shared by the "display thread" and the "search thread" is set ON. The connection information and the use conditions of devices other than the first-priority devices among all the devices on the current network are obtained in step S321. The connection information and the use conditions of the remaining devices, obtained in the search process achieved in step S321 are stored in the HD 110 in step S322.

After the connection information and the use conditions of all the devices on the network are stored in the HD 110 in steps S302' and S322, a "search termination flag" disposed in an area shared by the "display thread" and the "search thread" is set ON in step S303. The present thread is then terminated.

After the "search thread," described above, is activated, processes are achieved in the "display thread" from the following step S202. After the "search thread" shown in FIG. 8 is activated in step S201, the "display thread" enters a sleep state for one or two seconds in step S202. It is determined in step S221 whether the device map shown in the CRT 116 has been unupdated and whether the first-priority devices have been searched for. Whether searching has been finished is determined by whether the "priority-search termination flag" is ON or OFF, which is disposed at the area shared by the "display thread" and the "search thread." Whether the device map has been unupdated is determined by whether a "display flag" described later is ON or OFF. When it is determined that the device map shown in the CRT 116 has been unupdated and that the first-priority devices have not yet been searched for, the processing skips the next step S222 and proceeds to step S203. When it is determined in step S221 that the device map shown in the CRT 116 has been unupdated and that the first-priority devices have been searched for, the device map is updated in step S222 according to the resultant information (connection information and use-condition information) of the first-priority devices. Then, the "display flag" is set ON.

It is determined in step S203 whether the "search thread" has finished. When it is determined that the "search thread" has not yet been finished, the processing returns to step S202, the "display thread" enters the sleep state, and the termination of the "search thread" is awaited. When it is determined in step S203 that the "search thread" has been finished, the device map is re-displayed on the CRT 116 in step S204 according to the connection information and the use-condition information newly stored of all the devices on the network.

Fourth Embodiment

In a fourth embodiment, a device map is first displayed according to the static information of devices held in advance, and then, the displayed device map is updated according to the dynamic information of the devices obtained thereafter.

Device information is divided into static information and dynamic information. The static information is unchanged as time passes, and corresponds, for example, to information related to a printing resolution and a printing speed for a printer. The dynamic information changes as time passes, and corresponds, for example, to information related to the remaining amounts of expendables, such as recording paper and toner, the information of whether the printer is being used, and the information of whether an error occurs for the printer. Therefore, when static information, which is unchanged as time passes, is first displayed in the device map, the user can first obtain positive information only.

The information of a device optional unit which the user can freely attach or detach, such as an additional cassette and an optional finisher for a printer, is generally called semi-static information, but it is handled as static information in the fourth embodiment. However, the semi-static information may be handled as dynamic information in the fourth embodiment.

The fourth embodiment will be described below by referring to a flowchart shown in FIG. 11.

Figure 11:
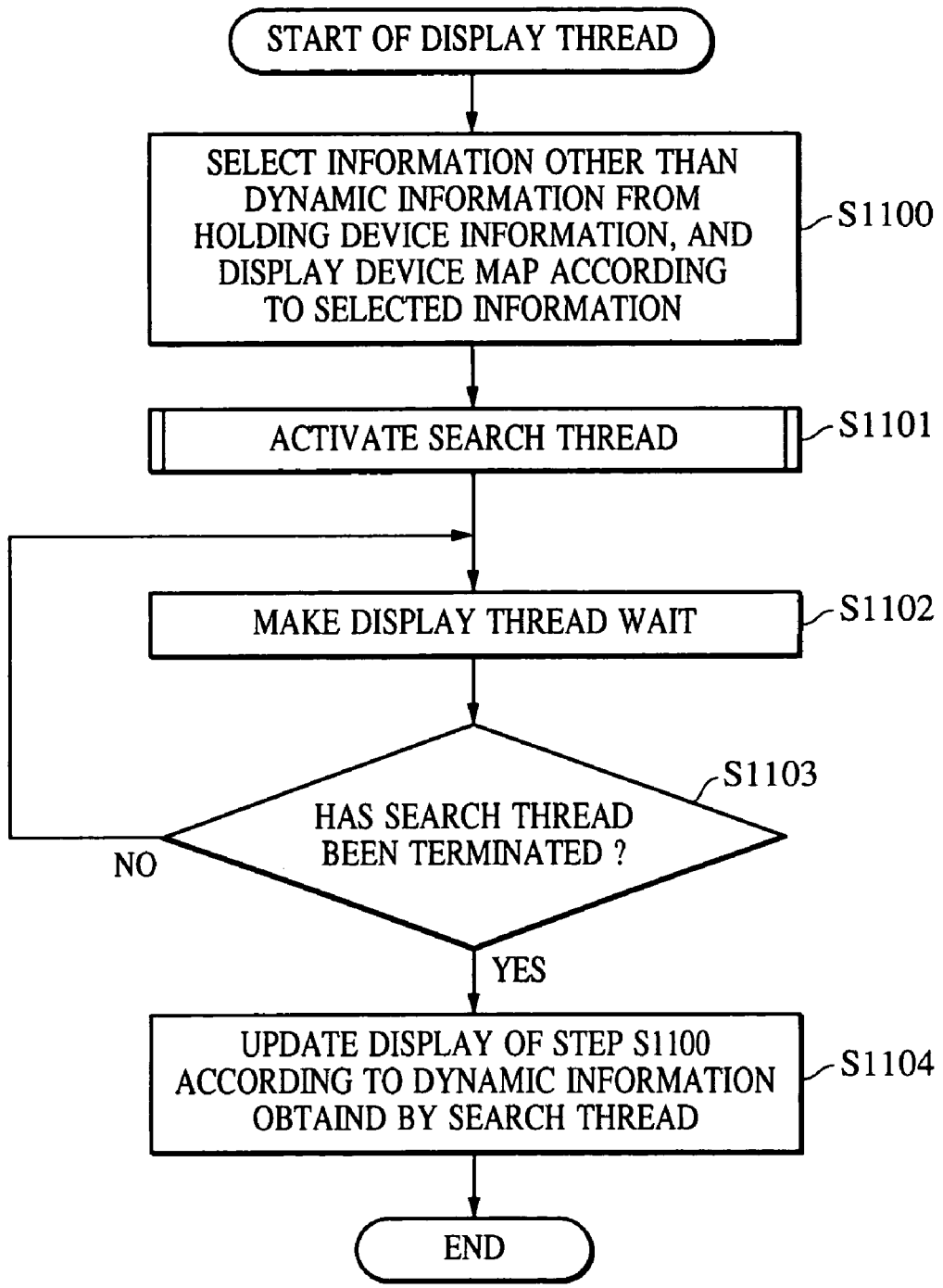
FIG. 11 is a flowchart of an operation ("display thread") of the information processing apparatus, according to a fourth embodiment.

FIG. 11 is a flowchart of display-thread processing activated by the information processing apparatus according to the fourth embodiment.

When an application program for displaying a device map is activated, the device map is displayed in step S1100 according to the static information of devices held in advance. The static information is selectively read from the device information table shown in FIG. 6. Whether information stored in the device information table is static information or dynamic information needs to be determined according to a predetermined rule.

In steps S1101, S1102, and S1103, a "search thread" is activated to obtain the current information of the devices through a network. In step S1104, dynamic information is selected from the device information obtained in the "search thread," and the device map displayed in step S1100 is updated according to the selected dynamic information. When it is found from the information obtained in the "search thread" that a new device has been connected or a connected device has been disconnected, the device map displayed in step S1100 is also updated accordingly.

Figure 12:
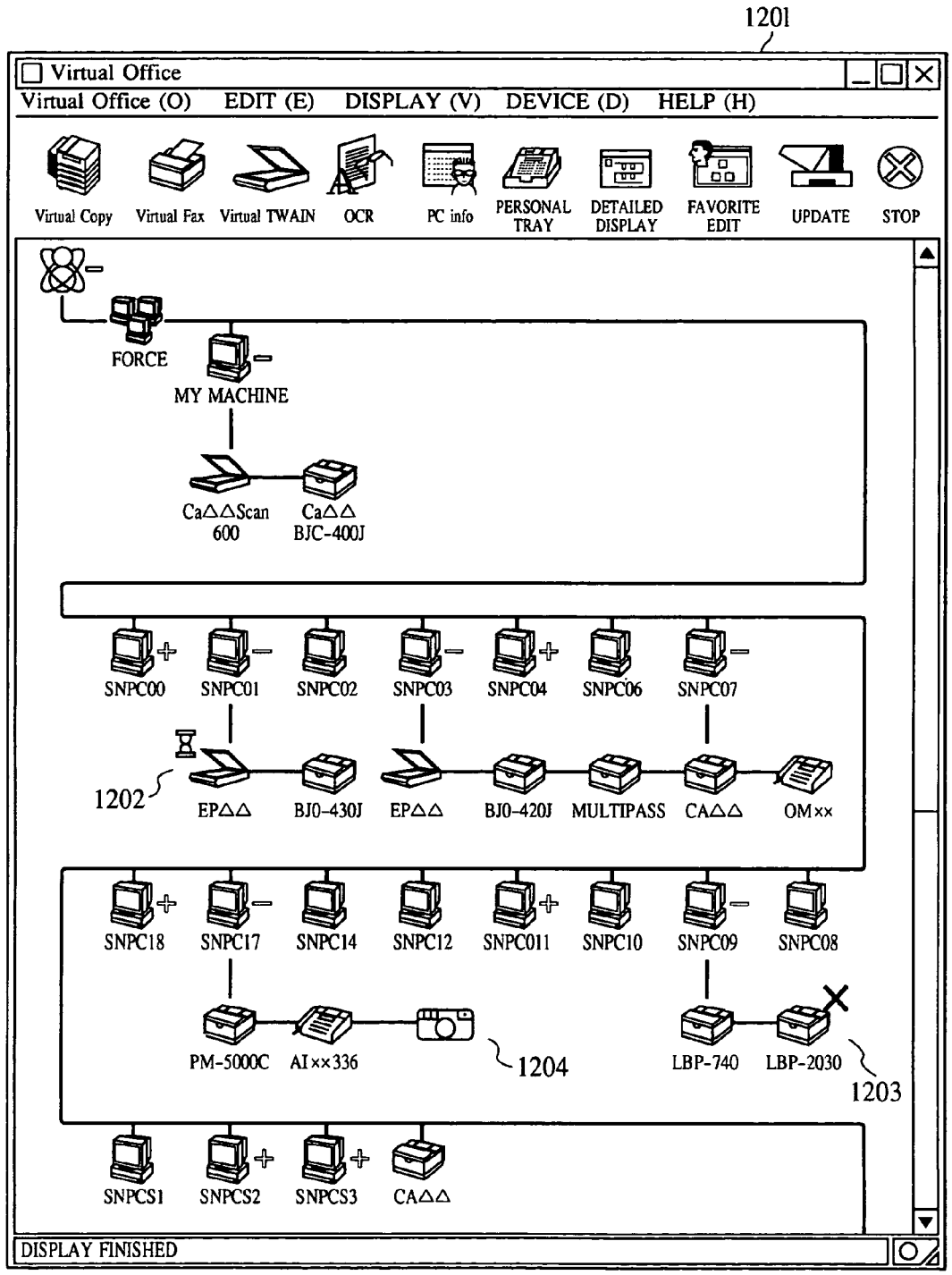
FIG. 12 is a view showing an example device map (when display finished) shown on the screen in the information processing apparatus in the fourth embodiment.

When the operations shown in the flowchart of FIG. 11 are executed, the device map shown in FIG. 4, for example, is displayed in the display process of step S1100, and the device map shown in FIG. 12 is displayed in the display process of step S1104. In the device map 1201 shown in FIG. 12, since dynamic information indicating that the scanner corresponding to the icon 43c shown in FIG. 4 is being used has been obtained, the icon 43c is changed to that 1202 shown in FIG. 12. Since dynamic information indicating that an error has occurred in the printer corresponding to the icon 43m shown in FIG. 4 has been obtained, the icon 43m is changed to that 1203 shown in FIG. 12. Errors include a case in which expendables of the printer, such as recording paper and toner, has run out, a case in which the remaining amount of expendables becomes smaller than a predetermined reference, and a case in which a recording-paper jam occurs. In addition, since information indicating that a new digital camera has been connected to the PC corresponding to the icon 42j shown in FIG. 4 has been obtained, the icon 1204 corresponding to the connected digital camera is shown in FIG. 12.

An object of the present invention is of course achieved when a recording medium which has stored a software program code implementing the functions of the host and the terminals shown in the first to third embodiments is sent to a system or to an apparatus, and a computer (CPU or MPU) of the system or the apparatus reads the program code stored in the storage medium and executes it. In this case, the program code itself read from the storage medium implements the functions of the first to third embodiments. The storage medium which has stored the program code is a part of the present invention. As the storage medium for supplying the program code, a ROM, a floppy disk, a hard disk, an optical disk, a magneto-optical disk, a CD-ROM, a CD-R, a magnetic tape, or a non-volatile memory card can be used.

The functions of the first to third embodiments are implemented by executing the program code read by the computer. In addition, the present invention also includes a case in which an operating system (OS) running on the computer executes the whole or a part of actual processing according to the instructions of the program code and the functions of the first to third embodiments are implemented by the processing.

Furthermore, the present invention includes a case in which the program code read from the storage medium is written into a memory provided for a function extension board inserted into the computer or for a function extension unit connected to the computer, a CPU provided for the function extension board or for the function extension unit executes the whole or a part of actual processing, and the functions of the first to third embodiments are implemented by the processing.

As descried above, in the present invention, when an application (display application) for displaying the statuses (connection states and use conditions) of devices (such as personal computers and peripheral devices) connected to a network is activated, the status information of the devices on the network is displayed according to that obtained previously, the latest status information of the devices on the network is obtained by parallel processing, and the status information of the devices on the network is re-displayed according to the latest information. Therefore, even if a large number of devices are connected to the network, a condition does not occur in which the display of the status information of the devices is delayed due to the time required to check the statuses of the devices. The user can efficiently achieve a desired work.

When the status information of a device is changed after a display application is activated, if the status information of the device is displayed in a predetermined display manner (such as blinking), the user can easily and positively recognize the device, and is always prevented from erroneously recognizing the device information. When the status information of a device is changed, if the display of the device is immediately updated according to the change of the status information, the user can recognize the latest device information in real time.

When priority in the order in which the status information of devices is obtained is given according to a predetermined condition, if the user specifies the predetermined condition in advance, the status information of a device desired by the user is first obtained and the information is soon displayed. Therefore, a response time to the user is improved.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An information processing apparatus that activates an application for displaying on a display screen information of a peripheral device that communicates with the information processing apparatus via a communication link, comprising:

storage means for storing information of the peripheral device that communicates via the communication link in a resident memory;

obtaining means for obtaining status information or alert information of the peripheral device through the communication link in response to an instruction to invoke the application;

first display control means for displaying on the display screen the information of the peripheral device that communicates via the communication link according to the information stored in the storage means prior to invoking the application in response to the instruction to invoke the application and before the obtaining means completes obtaining the status information or the alert information of the peripheral device from the peripheral device via the communication link; and second display control means for updating a content of the information displayed by the first display control means according to the status information or the alert information of the peripheral device obtained by the obtaining means in response to completion of a process for obtaining at least one of the status information and the alert information of the peripheral device from the peripheral device via the communication link.

2. An information processing apparatus according to claim 1, wherein the obtaining means obtains the status information or the alert information of the peripheral device from a storage device in the peripheral device.

3. An information processing apparatus according to claim 1, wherein the peripheral device is one of a printer, a scanner, and a facsimile machine.

4. An information processing apparatus according to claim 1, further comprising changing means for updating the information of the peripheral device that communicates via the communication link stored in the resident memory, according to the information obtained by the obtaining means.

5. An information processing apparatus according to claim 1, wherein the second display control means displays a progress of obtaining the status information or the alert information by the obtaining means, on the display screen.

6. An information processing apparatus according to claim 1, wherein the second display control means displays status information of a device for which the status information has been changed from a time when the application is first activated, in a predetermined display form.

7. An information processing apparatus according to claim 1, wherein the obtaining means sequentially obtains status information of each of a plurality of devices that communicates via the communication link in an order based on a predetermined condition.

8. An information processing apparatus according to claim 7, further comprising registration means for specifying the predetermined condition externally.

9. An information processing apparatus according to claim 1, further comprising determination means for determining whether the information of the peripheral device that communicates via the communication link stored in the storage means is dynamic information, which is changed as time passes, wherein the first display control means displays the information of the peripheral device that communicates via the communication link on the display screen according to information which is determined not to be dynamic information by the determination means.

10. An information processing apparatus according to claim 9, wherein the second display control means updates the content of the information displayed by the first display control means according to dynamic information of the peripheral device that communicates via the communication link obtained by the obtaining means.

11. An information processing apparatus according to claim 10, wherein the second display control means changes a form of a symbol of the information of the peripheral device displayed by the first display control means according to the dynamic information of the peripheral device that communicates via the communication link obtained by the obtaining means.

12. An information processing apparatus according to claim 11, wherein the dynamic information includes information related to a state of expendables for the peripheral device.

13. An information processing apparatus according to claim 11, wherein the dynamic information includes information related to whether an error has occurred in the peripheral device.

14. An information processing apparatus according to claim 11, wherein the dynamic information includes information related to whether the peripheral device is in use.

15. An information processing method for information processing apparatus for displaying on a display screen information of a peripheral device that communicates with the information processing apparatus via a communication link when all application is activated, comprising the steps of:
a reading step of reading information of the peripheral device that communicates via the communication link from a resident memory;
an obtaining step of obtaining status information or alert information of the peripheral device through the communication link in response to an instruction to invoke the application;
a first display control step of displaying on the display screen the information of the peripheral device that communicates via the communication link according to the information read from the resident memory prior to invoking the application in response to the instruction to invoke the application and before the obtaining step completes obtaining the status information or the alert information of the peripheral device from the peripheral device via the communication link; and
a second display control stop of updating a content of the information displayed in the first display control step, according to the status information or the alert information of the peripheral device obtained in the obtaining step in response to completion of a process for obtaining at least one of the status information and the alert information of the peripheral device from the peripheral device via the communication link.

16. An information processing method according to claim 15, wherein the obtaining step obtains the status information or the alert information of the peripheral device from a storage device in the peripheral device.

17. An information processing method according to claim 15, wherein the peripheral device is one of a printer, a scanner, and a facsimile machine.

18. An information processing method according to claim 15, further comprising a changing step for updating the information of the peripheral device that communicates via the communication link stored in the resident memory according to the information obtained in the obtaining step.

19. An information processing method according to claim 15, wherein a progress of obtaining information in the obtaining step is displayed on the display screen in the second display control step.

20. An information processing method according to claim 15, wherein status information of a device for which the status information has been changed from a time when the application is first activated is displayed in a predetermined display form in the second display control step.

21. An information processing method according to claim 15, wherein status information of each of a plurality of devices on the communication link is sequentially obtained in an order based on a predetermined condition in the obtaining step.

22. An information processing method according to claim 21, further comprising a registration step of specifying the predetermined condition externally.

23. An information processing method according to claim 15, further comprising a determination step of determining whether the information of the peripheral device that communicates via the communication link stored in the resident memory is dynamic information, which is changed as time passes,
wherein the information of the peripheral device that communicates via the communication link is displayed on the display screen in the first display control step according to information which is determined not to be dynamic information in the determination step.

24. An information processing method according to claim 23, wherein the content of the information displayed by the first display control step is updated in the second display control step according to dynamic information of the peripheral device that communicates via the communication link obtained in the obtaining step.

25. An information processing method according to claim 24, wherein a form of a symbol of the information of the device displayed in the first display control step is changed in the second display control step according to the dynamic information of the peripheral device that communicates via the communication link obtained in the obtaining step.

26. An information processing method according to claim 24, wherein the dynamic information includes information related to a state of expendables for the peripheral device.

27. An information processing method according to claim 24, wherein the dynamic information includes information related to whether an error has occurred in the peripheral device.

28. An information processing method according to claim 24, wherein the dynamic information includes information related to whether the peripheral device is in use.

29. A computer readable medium on which is stored a computer readable program, the program comprising computer executable code for an information processing apparatus for displaying on a display screen information of a peripheral device that communicates with the information processing apparatus via a communication link when an application is activated, the program comprising the steps of:
a reading step of reading information of the peripheral device that communicates via the communication link from a resident memory;
an obtaining step of obtaining status information or alert information of the peripheral device through the communication link in response to an instruction to invoke the application;
a first display control step of displaying on the display screen information of the peripheral device that communicates via the communication link according to the information read from the resident memory prior to invoking the application in response to the instruction to invoke the application and before the obtaining step completes obtaining the status information or the alert information of the peripheral device from the peripheral device via the communication link; and a second display control step of updating a content of the information displayed in the first display control step according to the status information or the alert information of the peripheral device obtained in the obtaining step in response to completion of a process for obtaining at least one of the status information and the alert information of the peripheral device from the peripheral device via the communication link.

30. A computer medium according to claim 29, wherein status information of a device for which the status information has been changed from a time when the application is first activated is displayed in a predetermined display form in the second display control step.

31. A computer medium according to claim 29, wherein status information of each of a plurality of devices on the communication link is sequentially obtained in an order based on a predetermined condition in the obtaining step.

32. A computer medium according to claim 31, further comprising a registration step of specifying the predetermined condition externally.

33. A computer medium according to claim 29, further comprising a determination step of determining whether the information of the peripheral device that communicates via the communication link stored in the resident memory is dynamic information, which is changed as time passes, wherein the information of the peripheral device that communicates via the communication link is displayed on the display screen in the first display control step according to information which is determined not to be dynamic information in the determination step.

34. A computer medium according to claim 33, wherein the content of the information displayed by the first display control step is updated in the second display control step according to dynamic information of the peripheral device that communicates via the communication link obtained in the obtaining step.

35. A computer medium according to claim 34, wherein a form of a symbol of the information of the device displayed in the first display control step is changed in the second display control step according to the dynamic information of the peripheral device that communicates via the communication link obtained in the obtaining step.

36. A computer medium according to claim 34, wherein the dynamic information includes information related to a state of expendables for the peripheral device.

37. A computer medium according to claim 34, wherein the dynamic information includes information related to whether an error has occurred in the peripheral device.

38. A computer medium according to claim 34, wherein the dynamic information includes information related to whether the peripheral device is in use.

39. An information processing apparatus that activates an application for displaying on a display screen information of a peripheral device that communicates with the information processing apparatus via a communication link, comprising:

a storage unit that stores information of the peripheral device that communicates via the communication link in a resident memory;

an obtaining unit that obtains status information or alert information of the peripheral device through the communication link in response to an instruction to invoke the application;

a first display control unit that displays on the display screen information of the peripheral device that communicates via the communication link according to the information stored in the storage unit prior to invoking the application in response to the instruction to invoke the application and before the obtaining unit obtains the status information or the alert information of the peripheral device front the peripheral device via the communication link; and a second display control unit that updates a content of the information displayed by the first display control unit according to the status information or the alert information of the peripheral device obtained by the obtaining unit in response to completion of a process for obtaining at least one of the status information and the alert information of the peripheral device from the peripheral device via the communication link.

* * * * *